US012533284B2

(12) United States Patent
Chen

(10) Patent No.: US 12,533,284 B2
(45) Date of Patent: Jan. 27, 2026

(54) CHANGEABLE MASSAGE DEVICE

(71) Applicant: YUN YANG INDUSTRIAL CO., LTD., Taichung (TW)

(72) Inventor: Shih-Chang Chen, Taichung (TW)

(73) Assignee: YUN YANG INDUSTRIAL CO., LTD., Taichung (TW)

( * ) Notice: Subject to any disclaimer, the term of this patent is extended or adjusted under 35 U.S.C. 154(b) by 917 days.

(21) Appl. No.: 17/825,922

(22) Filed: May 26, 2022

(65) Prior Publication Data

US 2023/0381056 A1 Nov. 30, 2023

(51) Int. Cl.
*A61H 15/00* (2006.01)

(52) U.S. Cl.
CPC . *A61H 15/0092* (2013.01); *A61H 2015/0014* (2013.01); *A61H 2201/1685* (2013.01)

(58) Field of Classification Search
CPC .................................................. A61H 15/0092
See application file for complete search history.

(56) References Cited

U.S. PATENT DOCUMENTS

| | | | | |
|---|---|---|---|---|
| 5,637,065 A * | 6/1997 | Chang | A63B 23/14 601/72 |
| 12,310,909 B2 * | 5/2025 | Mouragues | A61H 15/0092 |
| 2017/0209727 A1 * | 7/2017 | Miller | A63B 23/03525 |
| 2019/0060160 A1 * | 2/2019 | Krichevsky | A61H 15/0092 |
| 2020/0188219 A1 * | 6/2020 | Piucci, Jr. | A61H 15/0092 |
| 2022/0323289 A1 * | 10/2022 | Suokas | A61H 15/00 |
| 2022/0339060 A1 * | 10/2022 | Paget | A61H 15/0092 |

* cited by examiner

*Primary Examiner* — LaToya M Louis
(74) *Attorney, Agent, or Firm* — MUNCY, GEISSLER, OLDS & LOWE, P.C.

(57) ABSTRACT

A changeable massage device includes a main body, a position limiter, and a control member. The main body includes a combination part and a body part. The position limiter is slidably disposed on the combination member and has a limiting recess. The position limiter moves between an opening and a locking position. The control member is between the main body and the position limiter. The control member has an operation part and a connection part movably connected with the body part. When the position limiter is at the opening position, the operation part is pressed and engaged in the limiting recess, whereby a roller is mounted around or detached from the main body. When the position limiter is pressed to change to the locking position, the operation part leaves the limiting recess to abut against the position limiter, and the roller is fixed to the main body.

9 Claims, 5 Drawing Sheets

CHANGEABLE MASSAGE DEVICE

BACKGROUND OF THE INVENTION

1. Field of the Invention

The present invention relates to massage devices, and more particularly, to a changeable massage device with changeable rollers.

2. Description of the Related Art

After exercising and working out, it is necessary to relieve muscle tension through massage, so as to prevent sports injury and chronic injury caused by muscle tension.

Roller massage devices are used as auxiliary equipment for muscle massage. A roller massage device has a handgrip and a roller, and the roller is combined to the handgrip. The surface of the roller is provided with a massage pattern. When in use, the user holds the handgrip by hand, and the roller is placed on the muscle which needs to be massaged, such that the user pushes the roller back and forth by hand for massaging the muscle.

There are different types of rollers having different hardness, material, length, and diameter characteristics. According to the muscles of different body parts and massage areas, various rollers will be used. For example, large size rollers are suitable for using on a wide-ranged muscle groups; small size rollers and peanut massage balls are suitable for using on smaller muscle areas or trigger points; rollers of a material with a hardness of 70% are suitable for using on the muscles of both sides of the spine and neck; rollers of a material with a hardness of 90% are suitable for using on the muscles of the lower leg.

However, the roller of a conventional roller massage device is fixed on the handgrip and unable to be changed. The usage flexibility is relatively limited, so that the user needs to prepare a variety of massage rollers for meeting different massage needs. Therefore, the user needs to spend a large amount of money to purchase different types of massage rollers, and also has to prepare sufficient housing space for storing all the massage rollers. It is desirable for the industry to resolve the inconvenience of usage of conventional roller massage devices.

SUMMARY OF THE INVENTION

To improve the issues above, the present invention discloses a changeable massage device, wherein different types of rollers can be changed according to different demands, so as to increase the convenience of usage.

For achieving the aforementioned objectives, a changeable massage device is provided, comprising:

- a main body having an installation axis defined therein, the main body comprising a combination part and a block part arranged on two ends of the installation axis, respectively, with a body part arranged between the combination part and the block part, wherein a roller is mounted around the body part of the main body along the installation axis;
- a position limiter disposed on the combination part of the main body along the installation axis, with a limiting recess concavely formed on one lateral side of the position limiter, wherein the position limiter slides between an opening position and a locking position; and
- a control member disposed between the main body and the position limiter, the control member comprising an operation part and a connection part, the connection part movably connected with the body part of the main body, wherein when the position limiter is at the opening position, the operation part is allowed to be pressed by an external force to be engaged in the limiting recess, allowing the roller to be mounted around or detached from the body part of the main body; when the position limiter is pressed by an external force to move from the opening position to the locking position, the operation part of the control member leaves the limiting recess, and the operation part abuts against the position limiter, such that the roller is fixed to the main body, and two ends of the roller abut against the block part and the position limiter, respectively.

With such configuration, with the cooperation of the position limiter and the control member, different rollers can be easily replaced according to different massage demands. Therefore, the present invention effectively increases the convenience of usage, thereby improving the inconvenience of conventional roller massage devices whose roller is unable to be changed.

DETAILED DESCRIPTION OF THE INVENTION

Figure 1:
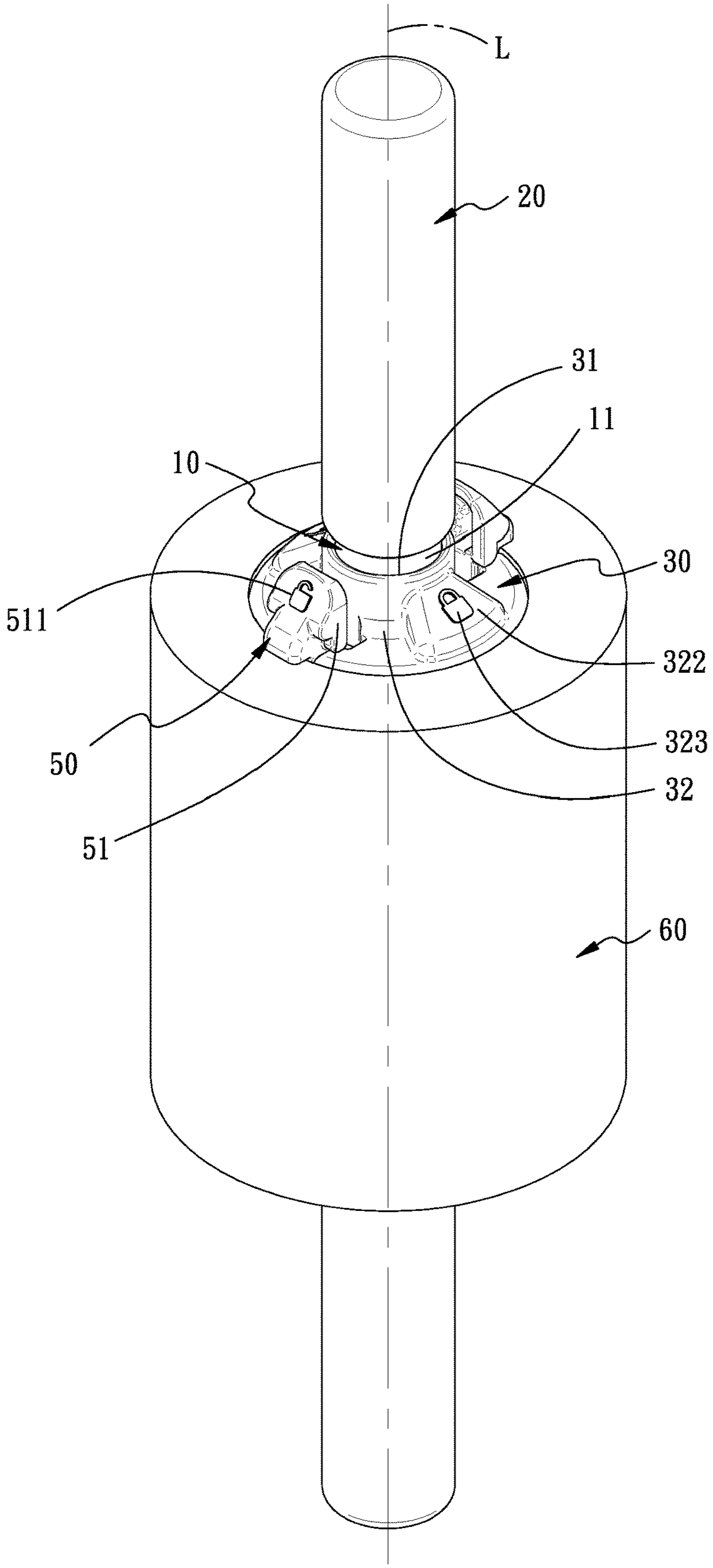
FIG. 1 is a perspective view of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

The directional terms of, for example, "up", "down", "front", "rear", "left", "right", "inner", "outer", and "side" are only used herein for illustrating the relative directions shown in the drawings. Therefore, the directional terms are applied for the purpose of illustration and understanding of the present invention, instead of limiting the present invention.

Referring to FIG. 1 to FIG. 5, the present invention provides a changeable massage device, comprising a main body 10, a position limiter 30, a position restoration member 40, and a control member 50.

The main body 10 is formed in an approximate circular column shape, with an installation axis L defined at the center thereof. The main body 10 comprises a combination part 11 and a block part 12 respectively arranged on two ends of the installation axis L, with a body part 13 disposed between the combination part 11 and the block part 12. In the embodiment, the combination part 11 is formed in a circular column shape, and the block part 12 is formed in a disk shape. The outer diameter of the combination part 11 is smaller than the outer diameter of the body part 13 and the block part 12; the outer diameter of the block part 12 is larger than the outer diameter of the body part 13, as shown by FIG. 2 and FIG. 3.

Figure 2:
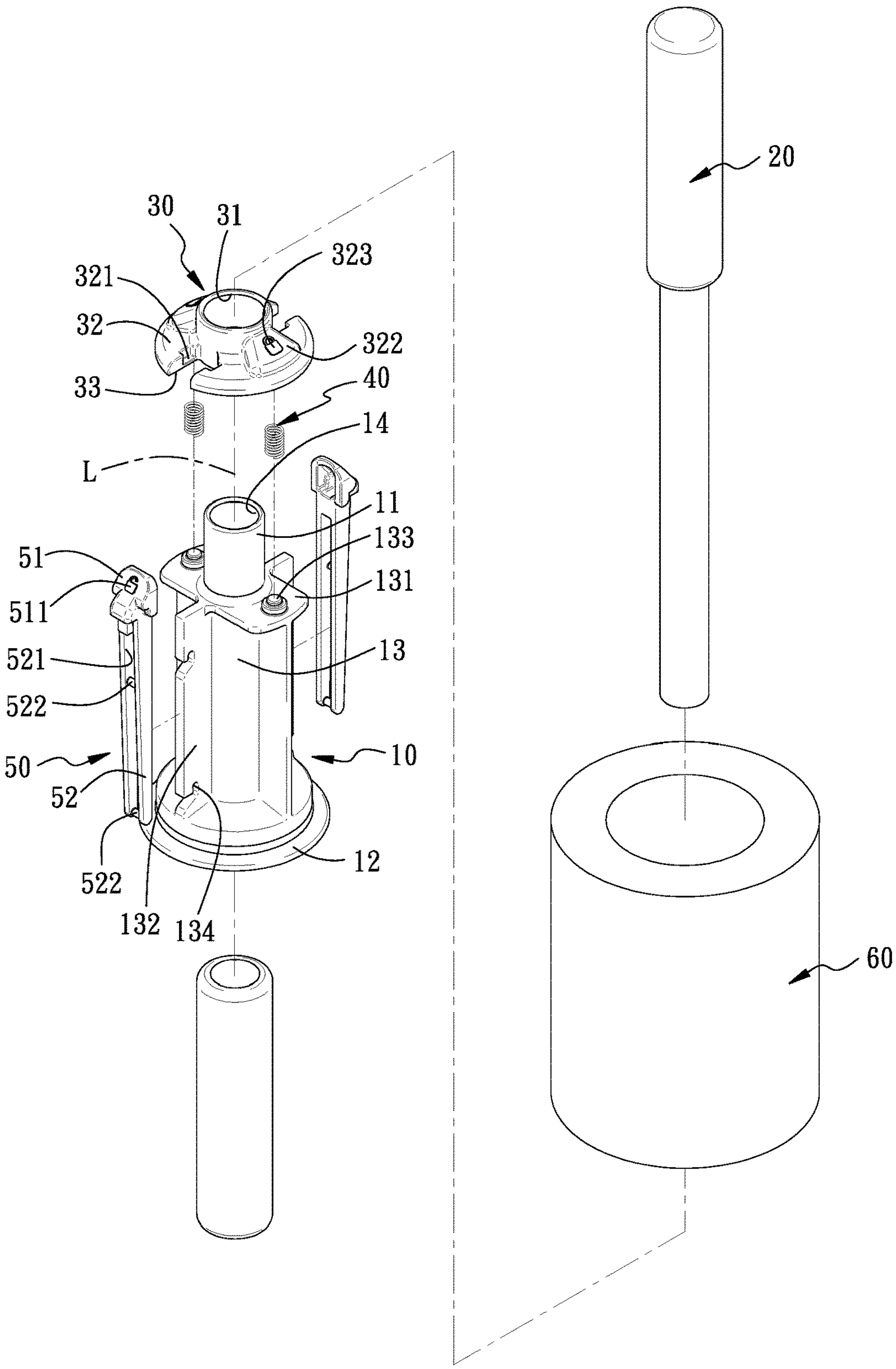
FIG. 2 is an exploded view of the present invention.
Figure 3:
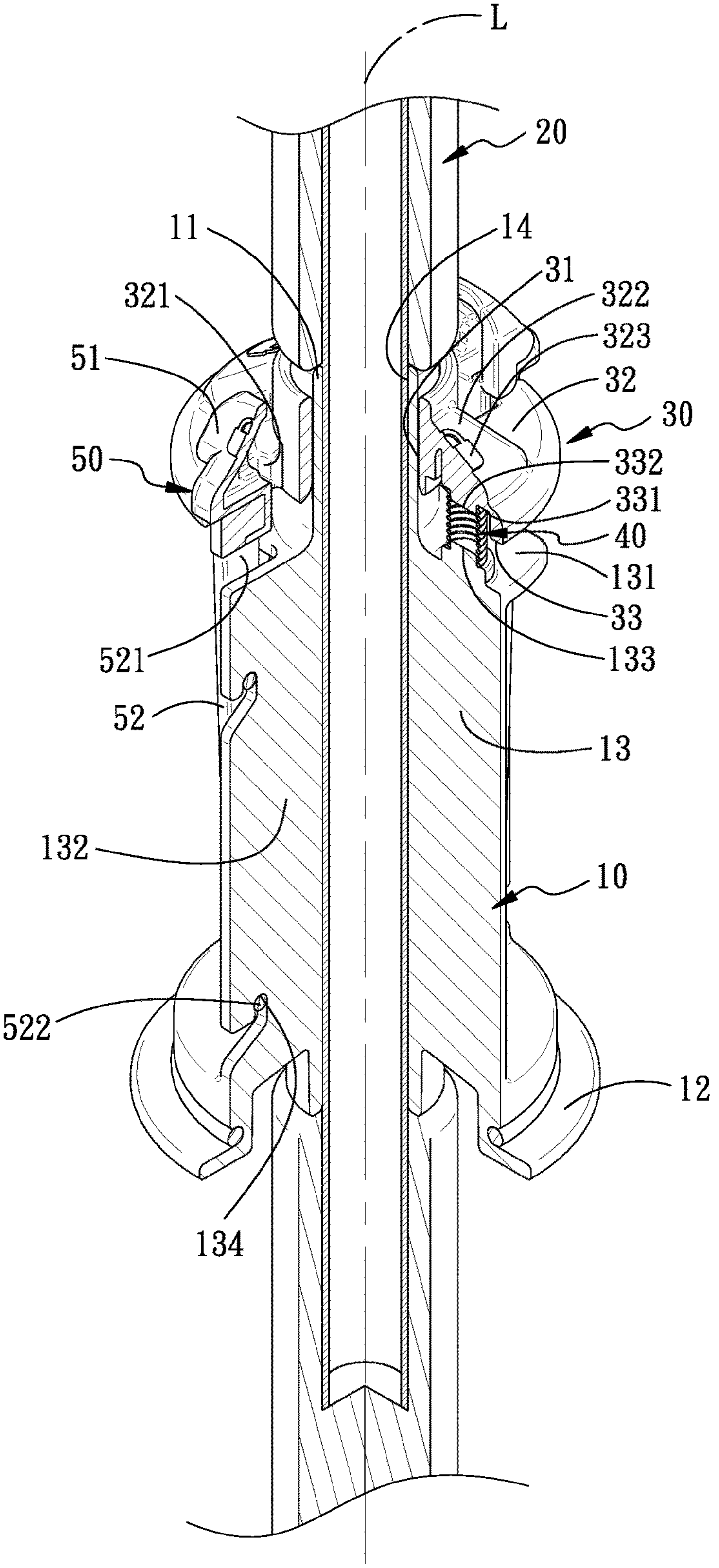
FIG. 3 is a schematic view illustrating the status of the present invention without roller installed thereon while the position limiter is at the opening position.

Also, the main body 10 comprises an opening 14 passing through the center thereof along the installation axis L, such that a handgrip 20 passes through the opening 14 for the user to grip, as shown by FIG. 1 and FIG. 2.

The body part 13 comprises a flange 131 and a positioning rib 132 convexly disposed on the outer periphery of the body part 13 in perpendicular to the installation axis L. The flange 131 is arranged in adjacent to the combination part 11, and comprises a protrusion block 133 protruding in parallel to the installation axis L. The positioning rib 132 comprises a hook groove 134 concavely formed thereon. In the embodiment, the present invention comprises two flanges 131 and two positioning ribs 132, wherein the two flanges 131 and the two positioning ribs 132 are staggered and symmetrically protruding on the body part 13; each positioning rib 132 comprises two hook grooves 134 at intervals, as shown by FIG. 2 and FIG. 3.

The position limiter 30 is disposed on the combination part 11 of the main body 10 along the installation axis L. Therein, the position limiter 30 comprises a through hole 31 passing through the center thereof. The position limiter 30 is mounted around the combination part 11 through the through hole 31, as shown by FIG. 2 and FIG. 3.

The position limiter 30 comprises a first face 32 and a second face 33 in opposite to the first face 32. The first face 32 comprises a concave limiting groove 321; the second face 33 comprises a concave positioning groove 331. The positioning groove 331 comprises a positioning block 332 protruding in parallel to the installation axis L. In the embodiment, the present invention comprises two limiting grooves 321 and two positioning grooves 331. The two limiting grooves 321 and two positioning grooves 331 are staggered and symmetrically concaved on the positioning limiter 30, as shown by FIG. 2 and FIG. 3.

Also, the first face 32 comprises two protruding press parts 322 symmetrically disposed thereon, and two limiting recess 321 are disposed between the two press parts 322. Therein, the surface of each press part 322 is provided with a lock icon 323. In the embodiment, the lock icon 323 presents a locking status of a lock, as shown by FIG. 1.

The position limiter 30 is allowed to slide between an opening position and a locking position along the installation axis L. Therein, when the position limiter 30 is at the opening position, the position limiter 30 is away from the body part 13. When the two press parts 322 are pressed by an external force, the position limiter 30 moves from the opening position to the locking position, and the position limiter 30 abuts against the body part 13 of the main body 10.

The position restoration member 40 has two ends thereof abutting against the position limiter 30 and the body part 13 of the main body 10. The position restoration member 40 is able to keep the position limiter 30 at the opening position. When the position limiter 30 is at the locking position, the position restoration member 40 generates a prestress which pushes the position limiter 30 from the locking position to the opening position. In the embodiment, the position restoration member 40 is a spring. When the position limiter 30 is at the locking status, the position restoration member 40 is in a compressed status. The present invention comprises two position restoration members 40, wherein the two position restoration members 40 are mounted around the protrusion block 133 of the two flanges 131 and the positioning block 332 of the two positioning grooves 331, respectively, so as to abut between the two flanges 131 of the body part 13 and the positioning limiter 30, as shown by FIG. 2 and FIG. 3.

The control member 50 is disposed between the main body 10 and the position limiter 30. The control member 50 comprises an operation part 51 and a connection part 52. The connection part 52 is movably connected with the body part 13 of the main body 10. Therein, the connection part 52 comprises a slide groove 521, and the slide groove 521 comprises a protruding engagement block 522 disposed therein. The slide groove 521 is slidably disposed on the positioning rib 132, with the engagement block 522 engaged in the hook groove 134. In the embodiment, the present invention comprises two control members 50, and the slide groove 521 of each connection part 52 comprises two engagement blocks 522 disposed at intervals.

Further, the operation part 51 is disposed on one end of the control member 50. Therein, the surface of the operation part 51 of the control member 50 is provided with an unlock icon 511. In the embodiment, the lock icon 323 presents an locking status of a lock, as shown by FIG. 1.

Figure 4:
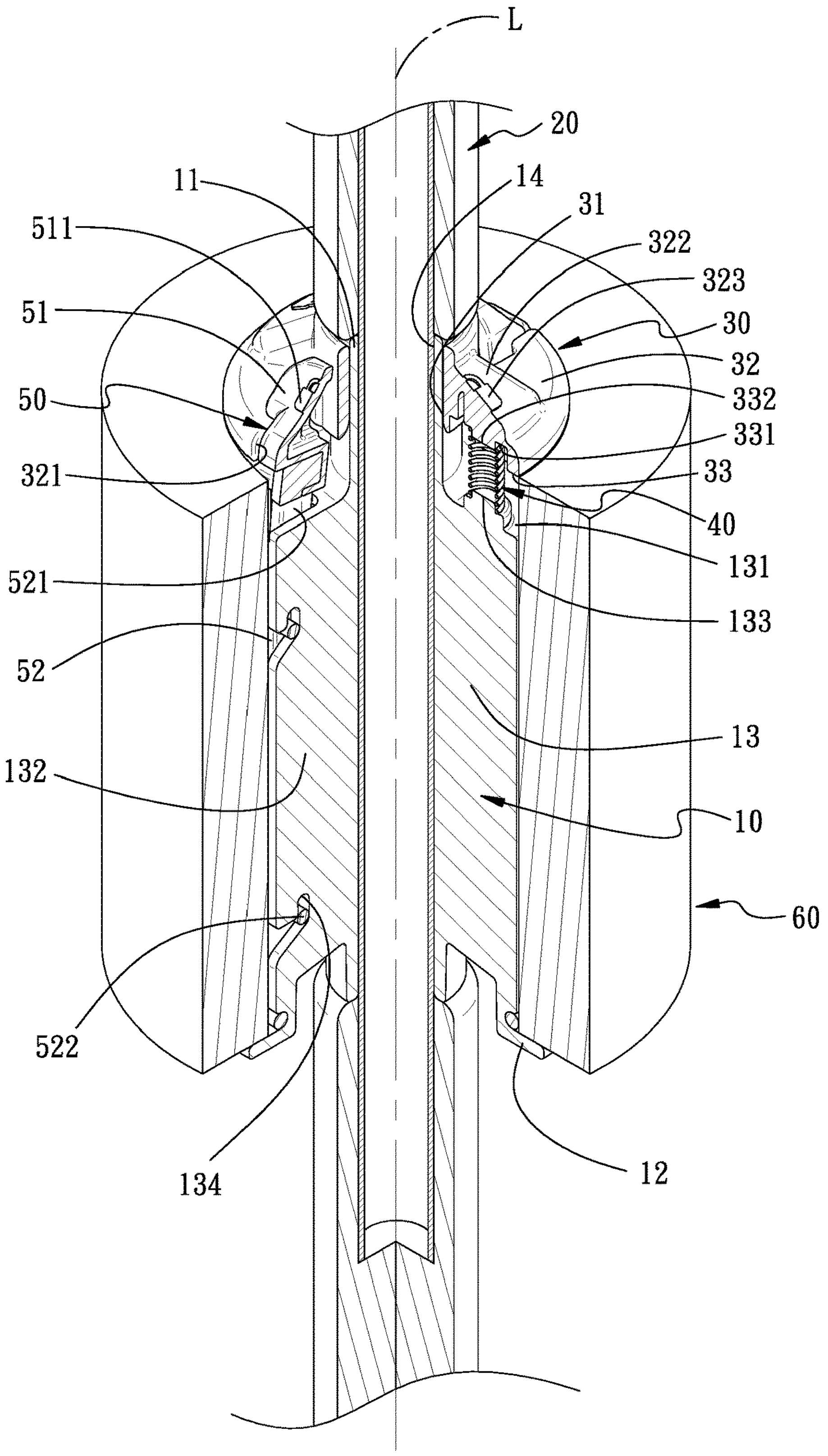
FIG. 4 is a schematic view illustrating the status of the present invention with the roller installed thereon while the position limiter is at the opening position.

Referring to FIG. 3 and FIG. 4, when the position limiter 30 is at the opening position, the operation part 51 of the control member 50 can be pressed by an external force to be engaged in the two limiting grooves 321 of the position limiter 30, allowing a roller 60 to be mounted around or detached from the body part 13 of the main body 10 along the installation axis L.

Figure 5:
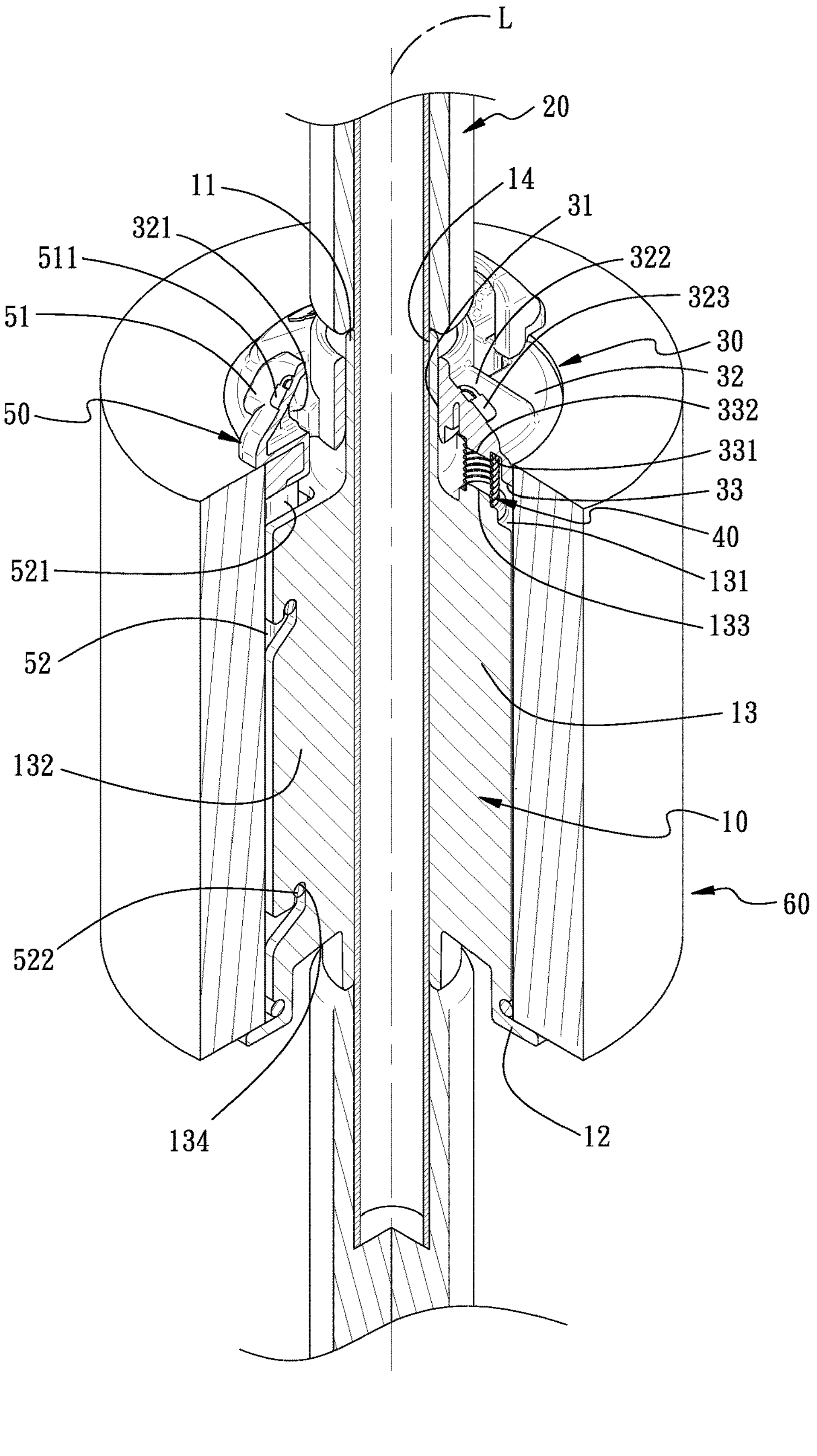
FIG. 5 is a schematic view illustrating the status of the present invention with the roller installed thereon while the position limiter is at the locking position.

Referring to FIG. 4 and FIG. 5, when the two press parts 322 of the position limiter 30 are pressed by an external force, the position limiter 30 moves from the opening position to the locking position, such that the two operation parts 51 of the control member 50 leave the two limiting recesses 321 of the position limiter 30, and the two connection parts 52 of the control members 50 are slidably disposed on the two positioning ribs 132 of the body part 13 through the two slide grooves 521, while the engagement block 522 is engaged in the hook groove 134, so as to prevent the two control members 50 from deviation when leaving the two limiting grooves 321 of the position limiter 30. Therein, when the position limiter 30 is at the locking position, the two operation parts 51 of the control members 50 abut against the position limiter 30, whereby the roller 60 is fixed to the main body 10, and two ends of the roller 60 abut against the block part 12 of the main body 10 and the second face 33 of the position limiter 30.

Notably, when the roller 60 is disposed on the main body 10 and the user needs to change the original roller 60 to another type of roller 60, the user imposes an external force to press the operation part 51 of the two control members 50, and the operation part 51 of the two control members 50 retracts to be engaged into the two limiting grooves 321 of the position limiter 30, so that the position limiter 30 is no longer pressed by the two control members 50, and the prestress of the two position restoration members 40 pushes the position limiter 30 from the locking position to the opening position. Accordingly, the original roller 60 is able to be detached from the main body 10, and another roller 60 is allowed to be mounted around the main body 10 along the installation axis L. Then, an external force is imposed to press the two press parts 322 of the position limiter 30, such that the position limiter 30 moves from the opening position to the locking position, whereby the newly installed roller 60 is fixed to the main body 10.

With the foregoing configuration, advantageous effects of the present invention will be illustrated below.

With the cooperation of the position limiter 30 and the control member 50, different types of rollers 60 can be easily changed according to demands. Therefore, the convenience of usage is improved.

The lock icon 323 on the two press parts 322 reminds the user of that the press parts 322 can be pressed to lock the present invention. The unlock icon 511 on the two operation parts 51 reminds the user of that the operation parts 51 can be pressed to unlock the present invention, so as to allow the roller 60 mount around or detach from the main body 10. Therefore, the present invention facilitates an easy identification and operation effect.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A changeable massage device, comprising:

a main body having an installation axis defined therein, the main body comprising a combination part and a block part arranged on two ends of the installation axis, respectively, with a body part arranged between the combination part and the block part, wherein a roller 1s mounted around the body part of the main body along the installation axis;

a position limiter disposed on the combination part of the main body along the installation axis, with a limiting recess concavely formed on one lateral side of the position limiter, wherein the position limiter slides between an opening position and a locking position; and an elongate control member disposed between the main body and the position limiter, the control member comprising an operation part and a connection part, the connection part movably connected with the body part of the main body, wherein when the position limiter is at the opening position, the operation part is allowed to be pressed by an external force to be engaged in the limiting recess, allowing the roller to be mounted around or detached from the body part of the main body; when the position limiter is pressed by an external force to move from the opening position to the locking position, the operation part of the control member leaves the limiting recess, and the operation part abuts against the position limiter, such that the roller is fixed to the main body, and two ends of the roller abut against the block part and the position limiter, respectively wherein the body part comprises a positioning rib radially disposed on an outer periphery of the body part in perpendicular to the installation axis; the connection part comprises a slide groove, and the slide groove is slidably disposed on the positioning rib.

2. The changeable massage device of claim 1, further comprising a position restoration member, two ends of the position restoration member abutting against the position limiter and the body part of the main body, respectively; when the position limiter is at the locking position, the position restoration member generates a prestress; when the position limiter is not abutted by the operation part of the control member, the prestress of the position restoration member pushes the position limiter from the locking position to the opening position.

3. The changeable massage device of claim 2, wherein the body part comprises a flange convexly disposed on an outer periphery of the body part in perpendicular to the installation axis, and the flange is arranged in adjacent to the combination part; the position restoration member abuts between the flange and the position limiter.

4. The changeable massage device of claim 3, wherein the position limiter comprises a first face and a second face in opposite to the first face; the first face comprises a concave limiting groove; the second face comprises a concave positioning groove; the positioning groove comprises a positioning block protruding in parallel to the installation axis; the flange comprises a protrusion block protruding in parallel to the installation axis; the two ends of the position restoration member are mounted around the positioning block and the protrusion block, respectively.

5. The changeable massage device of claim 4, wherein the first face comprises two protruding press parts symmetrically disposed thereon; when the two press parts are allowed to be pressed by an external force, whereby the position limiter moves from the opening position to the locking position.

6. The changeable massage device of claim 5, wherein two limiting grooves are provided; two control members are provided; the two limiting grooves are symmetrically concaved on the positioning limiter, and the two limiting grooves are disposed between the two press parts.

7. The changeable massage device of claim 6, wherein a surface of the two press parts is provided with a lock icon; a surface of the operation part of the two control members is provided with an unlock icon.

8. The changeable massage device of claim 1, wherein the positioning rib comprises a hook groove concavely formed thereon; the slide groove comprises a protruding engagement block disposed therein; the engagement block is engaged in the hook groove.

9. The changeable massage device of claim 1, wherein the main body comprises an opening passing through a center of the main body along the installation axis, such that a handgrip passes through the opening; the position limiter comprises a through hole passing through a center of the position limiter; the combination part is formed in a circular column shape; the position limiter is mounted around the combination part through the through hole.

* * * * *